United States Patent
Lim et al.

(10) Patent No.: US 11,717,999 B2
(45) Date of Patent: Aug. 8, 2023

(54) EQUIPMENT FOR MANUFACTURING CARBON BLOCK FILTER AND METHOD FOR MANUFACTURING CARBON BLOCK FILTER

(71) Applicant: PICOGRAM CO., LTD., Incheon (KR)

(72) Inventors: Sung Taek Lim, Gyeonggi-do (KR); Hyun Ki Hong, Incheon (KR)

(73) Assignee: PICOGRAM CO., LTD., Incheon (KR)

( * ) Notice: Subject to any disclaimer, the term of this patent is extended or adjusted under 35 U.S.C. 154(b) by 0 days.

(21) Appl. No.: 17/252,547

(22) PCT Filed: Jun. 12, 2019

(86) PCT No.: PCT/KR2019/007066
§ 371 (c)(1),
(2) Date: Dec. 15, 2020

(87) PCT Pub. No.: WO2019/245222
PCT Pub. Date: Dec. 26, 2019

(65) Prior Publication Data
US 2021/0252752 A1   Aug. 19, 2021

(30) Foreign Application Priority Data

Jun. 21, 2018   (KR) .................. 10-2018-0071379

(51) Int. Cl.
*B29C 45/00* (2006.01)
*B01D 39/20* (2006.01)
(Continued)

(52) U.S. Cl.
CPC ...... *B29C 45/0055* (2013.01); *B01D 39/2062* (2013.01); *B29C 45/0013* (2013.01);
(Continued)

(58) Field of Classification Search
None
See application file for complete search history.

(56) References Cited

U.S. PATENT DOCUMENTS

| 3,920,374 A * | 11/1975 | Redmer | B29C 45/40 |
| | | | 425/436 R |
| 2008/0054527 A1* | 3/2008 | Kang | B29C 45/73 |
| | | | 264/327 |
| 2014/0183786 A1* | 7/2014 | Kim | B29D 99/0042 |
| | | | 264/278 |

FOREIGN PATENT DOCUMENTS

| CN | 101869831 A | 10/2010 | |
| CN | 102189631 | * 9/2011 | B29C 43/02 |

(Continued)

OTHER PUBLICATIONS

English Translation of CN 102189631 (Year: 2011).*
(Continued)

*Primary Examiner* — Alison L Hindenlang
*Assistant Examiner* — Olukorede Esan
(74) *Attorney, Agent, or Firm* — Brooks Kushman P.C.

(57) ABSTRACT

Embodiments relate to apparatus for manufacturing a carbon block filter and a method for manufacturing a carbon block filter. The apparatus for manufacturing a carbon block filter according to an embodiment may include a mold having an inner space, a heater coupled to the mold to heat the mold, a material injection unit injecting a material to the mold heated by the heater, a material pressing unit pressing the material, and a filter separation unit separating a thermally treated filter from the mold heated by the heater.

8 Claims, 11 Drawing Sheets

(51) Int. Cl.
    *B29C 45/17*     (2006.01)
    *B29C 45/26*     (2006.01)
    *B29C 45/40*     (2006.01)
    *B29C 45/73*     (2006.01)
    *B29C 45/78*     (2006.01)
    *B29K 23/00*     (2006.01)
    *B29K 507/04*     (2006.01)
    *B29L 31/14*     (2006.01)
    *C02F 1/28*     (2023.01)
    *C02F 101/12*     (2006.01)

(52) U.S. Cl.
    CPC ........ *B29C 45/1769* (2013.01); *B29C 45/261* (2013.01); *B29C 45/40* (2013.01); *B29C 45/73* (2013.01); *B29C 45/78* (2013.01); *B01D 2239/10* (2013.01); *B29C 2945/7604* (2013.01); *B29C 2945/76254* (2013.01); *B29C 2945/76531* (2013.01); *B29C 2945/76732* (2013.01); *B29K 2023/065* (2013.01); *B29K 2023/0633* (2013.01); *B29K 2023/0683* (2013.01); *B29K 2507/04* (2013.01); *B29L 2031/14* (2013.01); *C02F 1/283* (2013.01); *C02F 2101/12* (2013.01); *C02F 2303/02* (2013.01); *C02F 2303/185* (2013.01)

(56) References Cited

FOREIGN PATENT DOCUMENTS

| | | | | |
|---|---|---|---|---|
| CN | 102189631 | A | 9/2011 | |
| CN | 204550803 | U | 8/2015 | |
| JP | 2008006435 | * | 1/2008 | ............ B29C 43/02 |
| JP | 2008006435 | A | 1/2008 | |
| KR | 100801184 | B1 | 2/2008 | |
| KR | 100907049 | B1 | 7/2009 | |
| KR | 20110009795 | U | 10/2011 | |
| KR | 20140078035 | * | 6/2014 | ............ B01J 19/12 |
| KR | 20140078035 | A | 6/2014 | |
| KR | 20180067064 | A | 6/2018 | |

OTHER PUBLICATIONS

International Search Report dated Sep. 18, 2019 of Korean patent application No. PCT/KR2019/007066, 5 pages.
Written Opinion of Korean application No. 20180071379 dated Jan. 26, 2023, 5 pages.
Written Decision on Registration of Korean application No. 20180071379 dated Mar. 22, 2023, 3 pages.
Amendment for Korean application No. 20180071379 dated Jan. 26, 2023, 5 pages.
Request for Submission of Opinion for Korean application No. 20180071379 dated Dec. 6, 2022, 7 pages.

* cited by examiner

[FIG. 1]
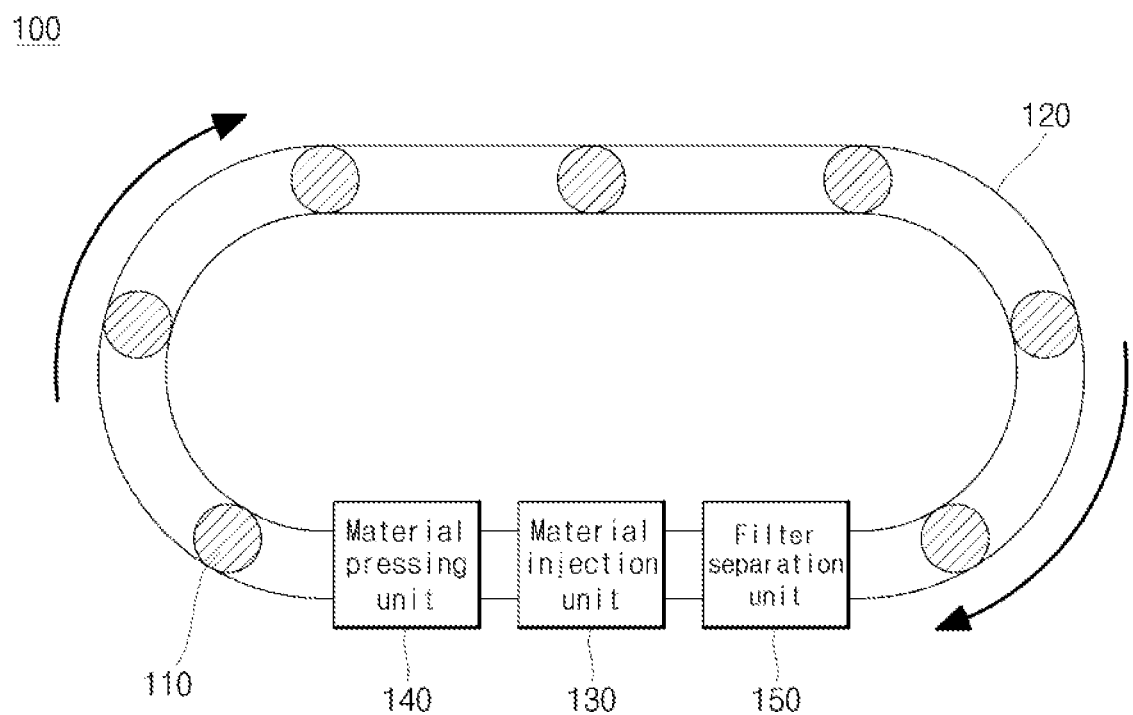

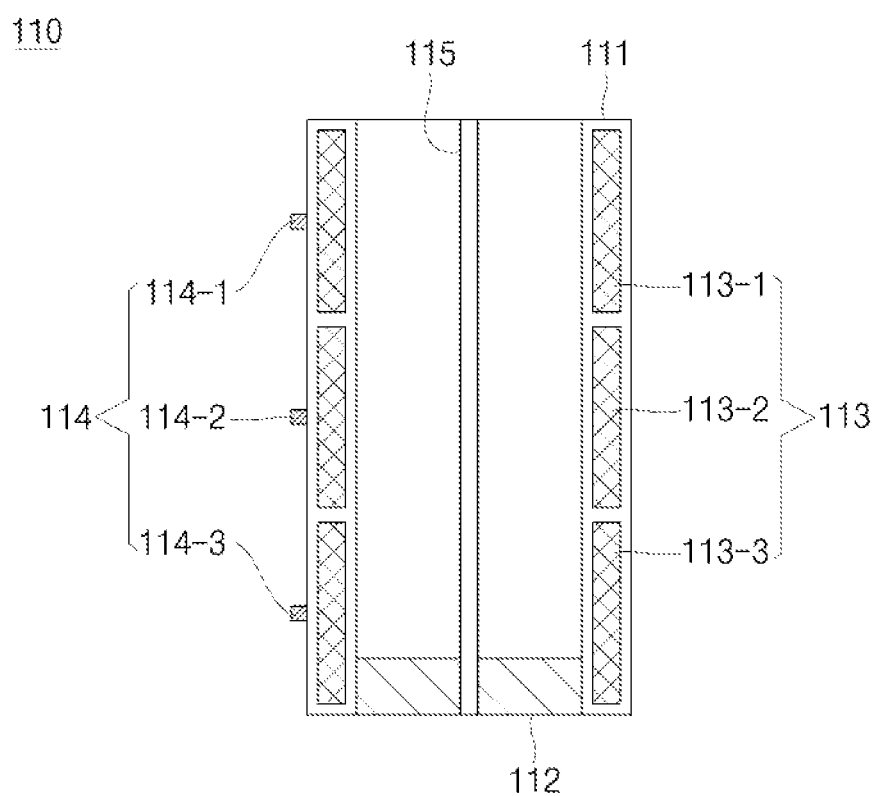
[FIG. 2]

[FIG. 3A]
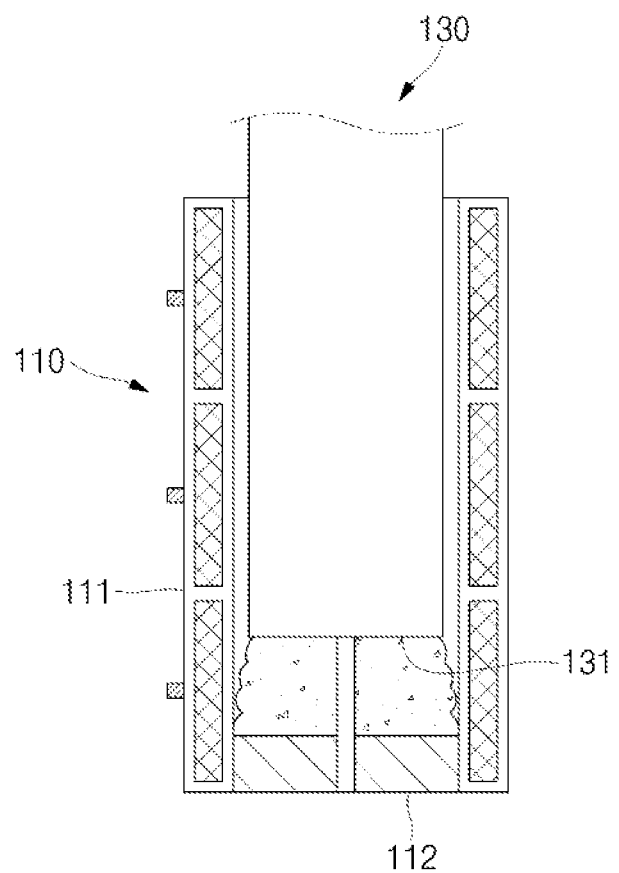

[FIG. 3B]
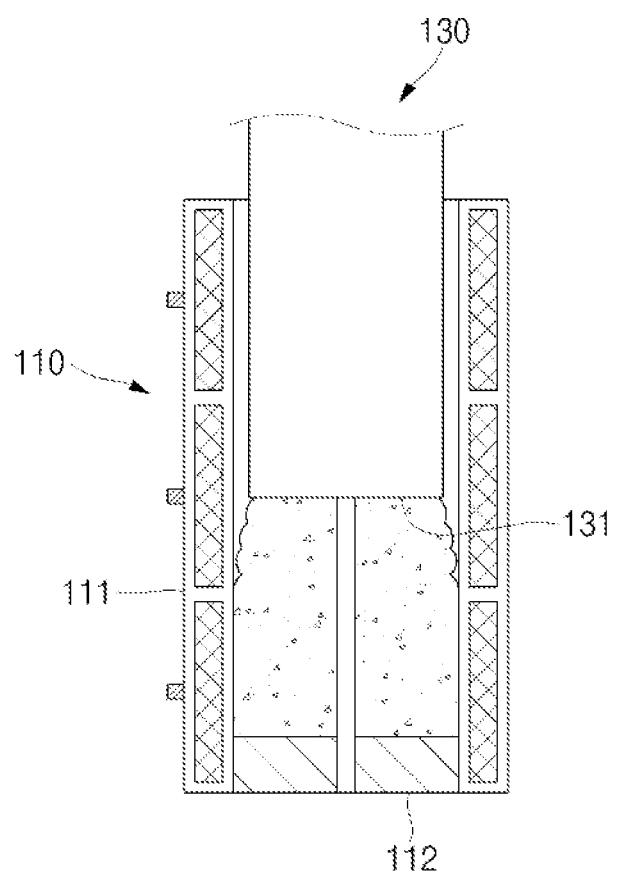

[FIG. 3C]
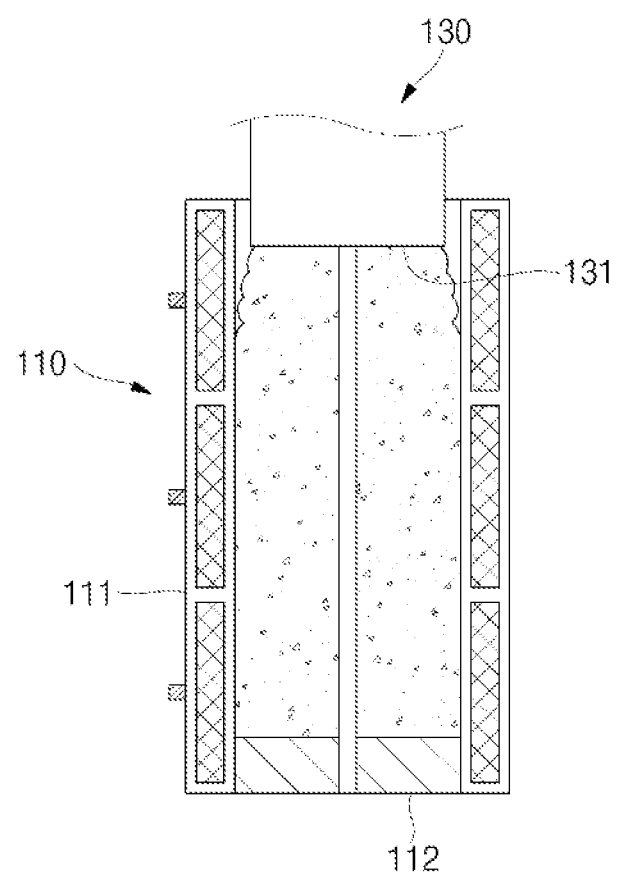

[FIG. 4A]
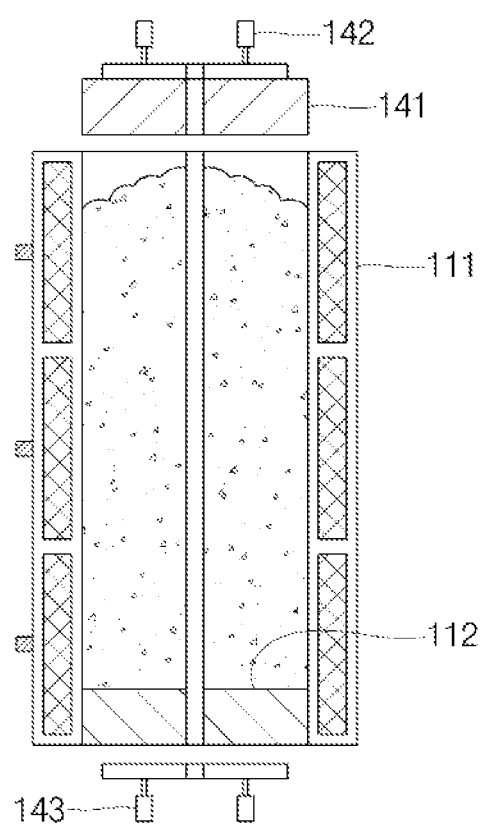

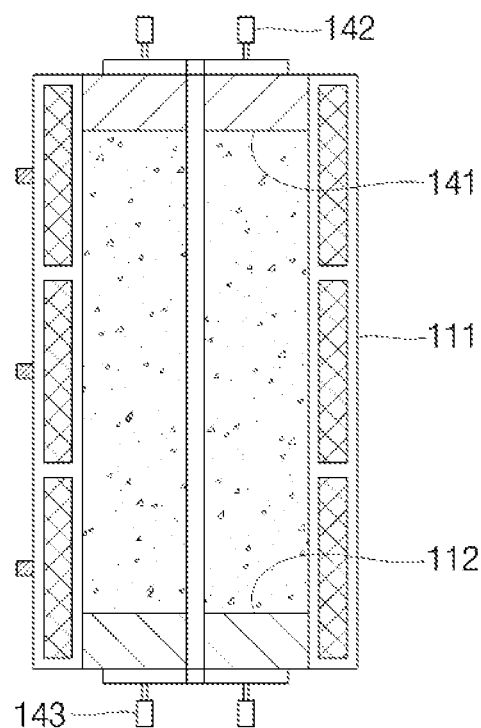
[FIG. 4B]

[FIG. 4C]
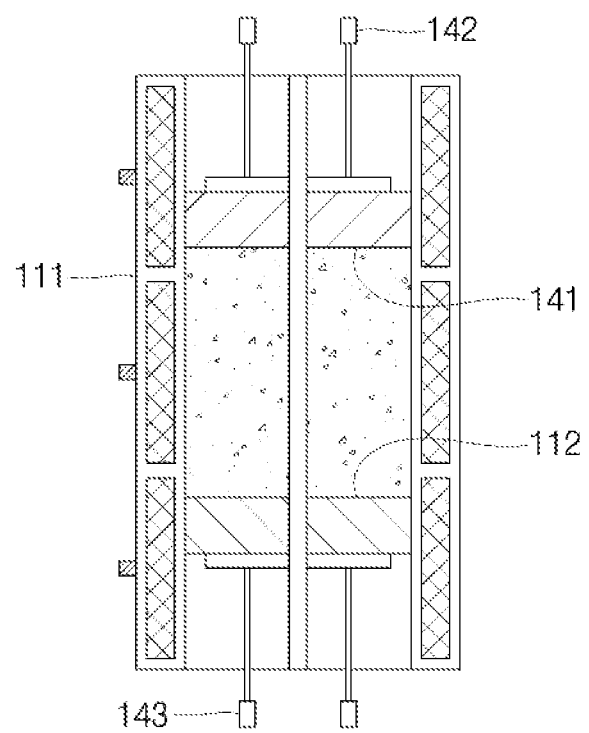

[FIG. 5]
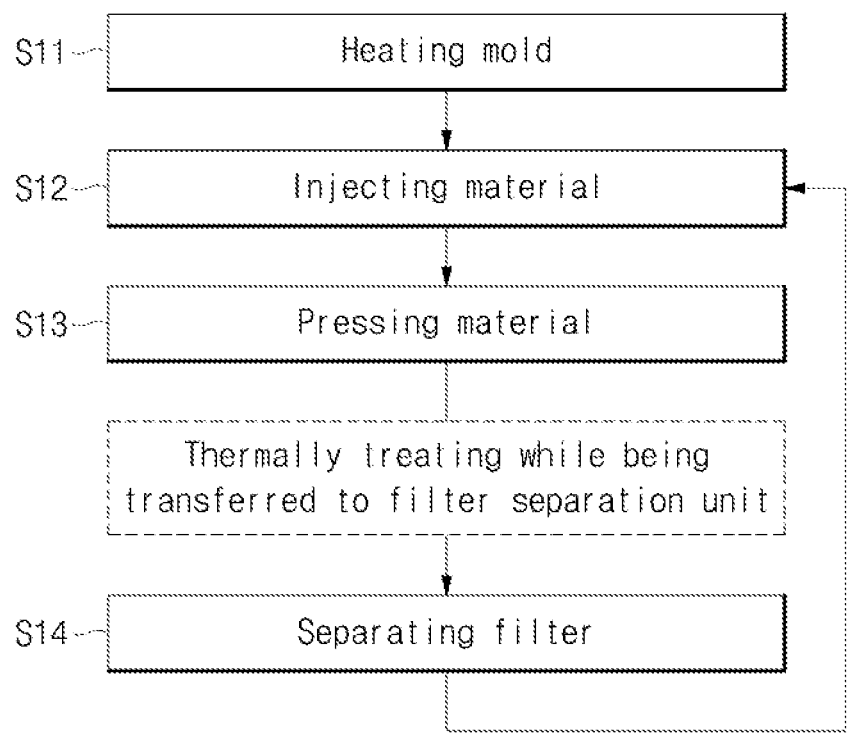

[FIG. 6]
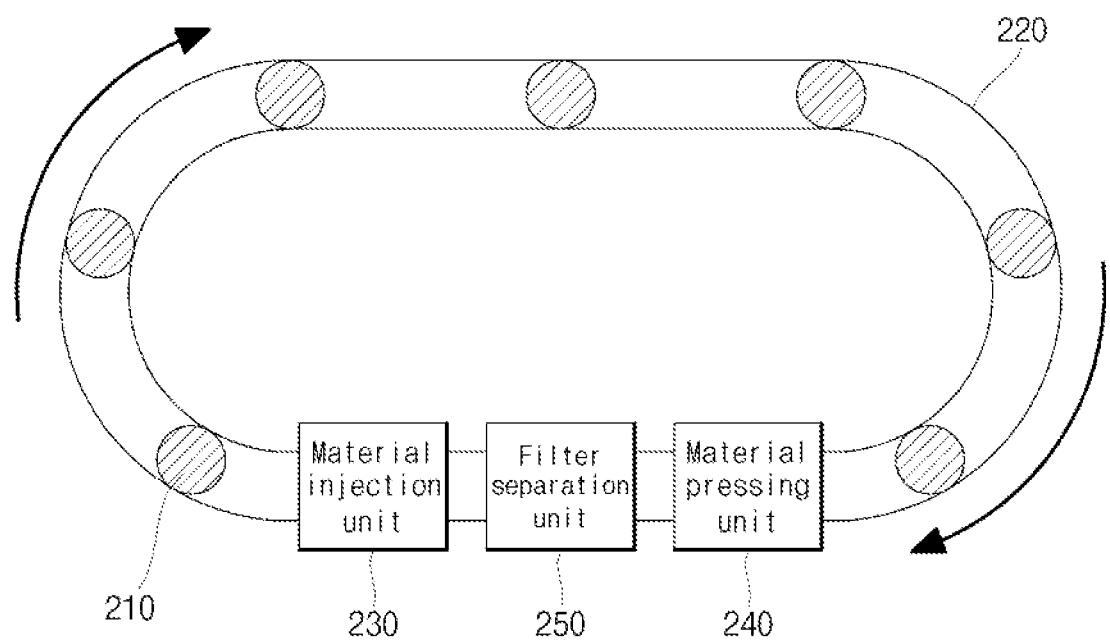

[FIG. 7]
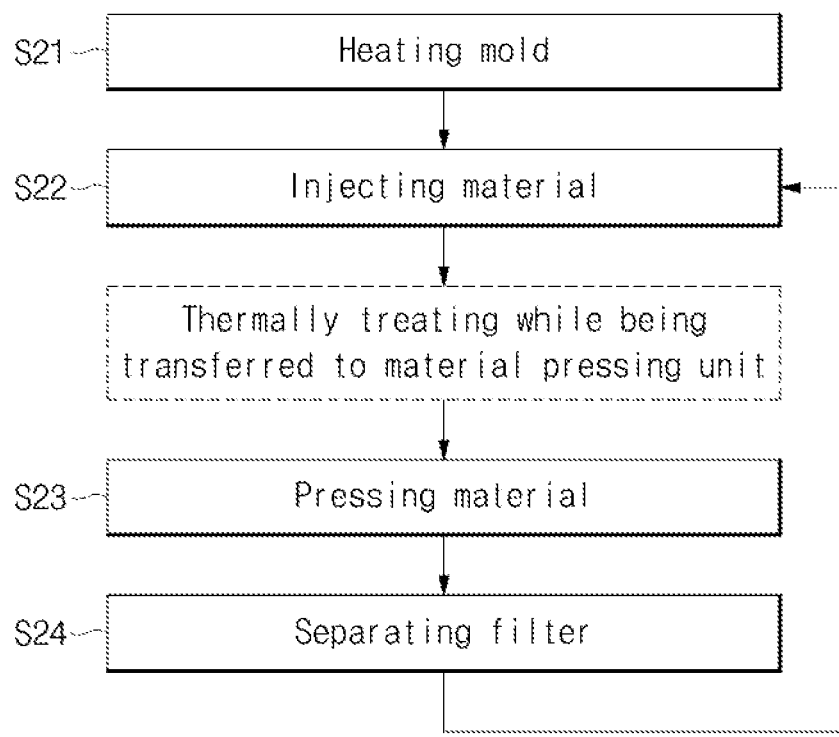

EQUIPMENT FOR MANUFACTURING CARBON BLOCK FILTER AND METHOD FOR MANUFACTURING CARBON BLOCK FILTER

CROSS-REFERENCE TO RELATED APPLICATIONS

This application is the US national phase of PCT/KR2019/007066 filed on Jun. 12, 2019, which claims priority to KR Patent Application No. 10-2018-0071379 filed on Jun. 21, 2018, the disclosures of which are incorporated in their entirety by reference herein.

BACKGROUND

1. Field

Embodiments relate to equipment for manufacturing a carbon block filter and a method for manufacturing a carbon block filter.

2. Description of the Related Art

A carbon block filter is widely used in a water purifier for the purpose of removing chlorine, an organic material, and all sorts of smells in water.

The carbon block filter is generally manufactured by a method of inputting binder and activated carbon for manufacturing a filter into an extrusion molding device and extruding the inputted materials with a specific temperature and a specific pressure.

However, in the above-described extruding process, the performance (e.g., a VOC removing performance of the activated carbon) of the filter may be degraded as pores of the activated carbon are blocked by the pressure.

However, in the above-described extruding process, the performance (e.g., a VOC removing performance of the activated carbon) of the filter may be degraded as pores of the activated carbon are blocked by the pressure.

SUMMARY

An aspect of the present disclosure provides apparatus for manufacturing a carbon block filter, which is capable of reducing the manufacturing time and the manufacturing cost. The present disclosure further provides a method for manufacturing a carbon block filter.

According to at least one of embodiments, apparatus for manufacturing a carbon block filter includes: a mold having an inner space; a heater coupled to the mold to heat the mold; a material injection unit configured to inject a material to the mold heated by the heater; a material pressing unit configured to press the material; and a filter separation unit configured to separate a thermally treated filter from the mold heated by the heater.

Also, the apparatus may further include a temperature sensor configured to measure a temperature of the mold, and the heater may be controlled to stop operating when a temperature measured by the temperature sensor is higher than a predetermined range and operate again when the temperature measured by the temperature sensor is lower than the predetermined range.

Also, the heater may be divided in plurality, and the plurality of heaters may be independently controlled.

Also, the apparatus may further include a transferring unit extending along a circumference of a closed figure to transfer the mold in one direction. Here, each of the material injection unit, the material pressing unit, and the filter separation unit may be installed to perform a function thereof on the mold transferred on the transferring unit, the filter separation unit, the material injection unit, and the material pressing unit may be disposed adjacent to each other in an order with respect to a direction in which the mold is transferred, and a distance of transferring the mold from the material pressing unit to the filter separation unit may be spaced in correspondence to a time required for thermally treating the material.

Also, the apparatus may further include a transferring unit extending along a circumference of a closed figure to transfer the mold in one direction. Here, each of the material injection unit, the material pressing unit, and the filter separation unit may be installed to perform a function thereof on the mold transferred on the transferring unit, the material pressing unit, the filter separation unit, and the material injection unit may be disposed adjacent to each other in an order with respect to a direction in which the mold is transferred, and a distance of transferring the mold from the material injection unit to the material pressing unit may be spaced in correspondence to a time required for thermally treating the material.

Also, an injection hole of the material injection unit may be inserted to the inner space through an upper end of the mold and disposed at a lower portion of the mold, and then gradually withdrawn upward as the material is injected.

Also, the mold may have a pipe shape extending in a vertical direction, and the apparatus may further include: an upper plate disposed at an upper end of the mold to block the inner space and being movable downward; a lower plate disposed at a lower end of the mold to block the inner space and being movable upward; an upper punch configured to press the upper plate downward; and a lower punch configured to press the lower plate upward simultaneously when the upper punch presses the upper plates downward.

Also, the material may include an activated carbon and a binder, the binder may be made of low-density polyethylene (LDPE), high-density polyethylene (HDPE), or ultrahigh molecular weight polyethylene (UHMWPE), and the heater may heat the mold at a temperature of about 100° C. to about 140° C. when the binder is made of LDPE, at a temperature of about 120° C. to about 180° C. when the binder is made of HDPE, and at a temperature of about 130° C. to about 250° C. when the binder is made of UHMWPE.

Also, the activated carbon may have a particle size of about 50 meshes to about 325 meshes.

Also, the binder may have a particle size corresponding to that of the activated carbon.

According to another embodiment, a method for manufacturing a carbon block filter includes: heating a mold by using a heater; injecting a material to the mold heated by the heater by transferring the mold heated by the heater to a material injection unit; pressing the material by transferring the mold heated by the heater to a material pressing unit; and separating a thermally treated filter from the mold heated by the heater by transferring the mold heated by the heater to a filter separation unit.

Also, the heater may be continuously controlled to stop operating when a temperature of the mold is higher than a predetermined range and operate again when the temperature of the mold is lower than the predetermined range after the heating of the mold.

Also, the injecting of the material by transferring the mold heated by the heater to the material injection unit may be performed after the separating of the filter.

Also, a distance of transferring the mold from the material pressing unit to the filter separation unit may be spaced in correspondence to a time required for thermally treating the material.

Also, a distance of transferring the mold from the material injection unit to the material pressing unit may be spaced in correspondence to a time required for thermally treating the material.

Also, in the injecting of the material, an injection hole of the material injection unit may be inserted to an inner space through an upper end of the mold and disposed at a lower portion of the mold, and then gradually withdrawn upward as the material is injected.

Also, in the pressing of the material, the material may be pressed simultaneously and together from both sides thereof in directions that are gradually close to each other.

Also, the material may include an activated carbon and a binder, the binder may be made of LDPE. HDPE, or UHMWPE, and in the heating of the material, the mold may be heated at a temperature of about 100° C. to about 140° C. when the binder is made of LDPE, at a temperature of about 120° C. to about 180° C. when the binder is made of HDPE, and at a temperature of about 130° C. to about 250° C. when the binder is made of UHMWPE.

Also, the activated carbon may have a particle size of about 50 meshes to about 325 meshes.

Also, the binder may have a particle size corresponding to that of the activated carbon.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings:

FIG. 1 is a schematic view of equipment for manufacturing a carbon block filter according to an embodiment;

FIG. 2 is a schematic view of a filter molding unit of the equipment for manufacturing a carbon block filter according to an embodiment;

FIG. 3A-3C are views illustrating a state of injecting a material to an inner space of a mold by using a material injection unit in the equipment for manufacturing a carbon block filter according to an embodiment;

FIG. 4A-4C are views illustrating a state of pressing the material in the inner space of the mold by using a material pressing unit in the equipment for manufacturing a carbon block filter according to an embodiment;

FIG. 5 is a flowchart representing a method for manufacturing a carbon block filter according to an embodiment;

FIG. 6 is a schematic view of equipment for manufacturing a carbon block filter according to another embodiment; and FIG. 7 is a flowchart representing a method for manufacturing a carbon block filter according to another embodiment.

DETAILED DESCRIPTION

Hereinafter, equipment for manufacturing a carbon block filter and a method for manufacturing a carbon block filter according to an embodiment will be described in detail with reference to the accompanying drawings.

FIG. 1 is a schematic view of equipment 100 for manufacturing a carbon block filter (hereinafter, referred to as "carbon block filter manufacturing equipment 100") according to an embodiment, and FIG. 2 is a schematic view of a filter molding unit 110 of the carbon block filter manufacturing equipment 100 according to an embodiment.

Referring to FIG. 1, the carbon block filter manufacturing equipment 100 includes a filter molding unit 110, a transferring unit 120, a material injection unit 130, a material pressing unit 140, and a filter separation unit 150.

Referring to FIG. 2 in conjunction with FIG. 1, the filter molding unit 110 includes a mold 111, a lower plate 112, a heater 113, a temperature sensor 114, and a core 115.

The mold 111 has a pipe shape having an inner space and opened both ends. The mold 11 may have various shapes such as a circular pipe shape extending in a vertical direction and a rectangular pipe shape extending in the vertical direction according to a preferred shape of the carbon block filter (hereinafter, referred to as a "filter").

In this case, the lower plate 112 is disposed at a lower end of the mold 111 to block the inner space of the mold 111. In other words, the lower plate 112 becomes a bottom of the inner space of the mold 111. The above-described lower plate 112 is installed to be movable in an upward direction toward the inner space of the mold 111.

The heater 113 is provided to heat the mold 111. As illustrated in FIG. 2, the heater 113 may be disposed in a wall of the mold 111.

Here, the heater 113 may be controlled by a separate temperature adjusting device (not shown) to maintain a temperature of the inner space of the mold 111 within a predetermined range. For example, the temperature sensor 114 for measuring a temperature of the mold 111 may be mounted to stop an operation of the heater 113 when a temperature measured by the temperature sensor 114 is greater than an upper limit of the predetermined range. When a temperature measured by the temperature sensor 114 is less than a lower limit of the predetermined range as the temperature of the inner space of the mold 111 decreases by stopping the operation of the heater 113, the heater 113 may operate again.

Furthermore, the heater 113 may be divided into plurality, and a plurality of heaters 113 may be independently controlled to maintain the temperature of the inner space of the mold 111 over an entire area thereof. For example, the heater 113 may include: a first heater 113-1 for heating mainly an upper portion of the mold 111; a second heater 113-2 for heating mainly an intermediate portion of the mold 111; and a third heater 113-3 for heating mainly a lower portion of the mold 111, and the heaters independently operate. Also, the temperature sensor 114 may include: a first temperature sensor 114-1 for measuring a temperature of the upper portion of the mold 111; a second temperature sensor 114-2 for measuring a temperature of the intermediate portion of the mold 111; and a third temperature sensor 114-3 for measuring a temperature of the lower portion of the mold 111. Thus, when a temperature measured by each of the second temperature sensor 114-2 and the third temperature sensor 114-3 is within a predetermined range while a temperature measured by the first temperature sensor 114-1 is greater than the predetermined range, only an operation of the first heater 113-1 may be stopped until the temperature measured by the first temperature sensor 114-1 is lower than the lower limit of the predetermined range, and the second heater 113-2 and the third heater 113-3 may continuously operate until the temperature measured by each of the second temperature sensor 114-2 and the third temperature sensor 114-3 is greater than the upper limit of the predetermined range.

In addition, a system including the mold 111 and the heater 113 may be approximately insulated from the outside to further efficiently maintain the temperature of the inner space of the mold 111.

The core 115 may have a bar shape and be disposed along a longitudinal direction thereof, which is a substantially central axis, in the inner space of the mold 111. The filter may have a hollow structure by the above-described core 115. When the filter having a solid structure is intended to be molded depending on cases, the core 115 may be omitted.

The transferring unit 120 extends along a circumference of an arbitrary closed figure and serves to transfer the filter molding unit 110 in one direction.

Although the transferring unit 120 exemplarily extends along a circumference of an oval shape in FIG. 1, the transferring unit 120 may have different constitution according to an individual environment of the manufacturing equipment as long as the transferring unit 120 may transfer the filter molding unit 110 to circulate the material injection unit 130, the material pressing unit 140, and the filter separation unit 150.

The material injection unit 130 serves to inject a material for filter manufacturing (hereinafter, referred to as a "material") into the inner space of the mold 111.

Here, the material may include a powdered or fibrous activated carbon and a binder and may further include a material for removing all sorts of impurities and an antibacterial material. Here, the powdered activated carbon may have a particle size of about 50 meshes to about 325 meshes, particularly a particle size of about 200 meshes to about 325 meshes. The binder may be made of polyethylene that is a polyolefin-based material. As necessity, the binder may be made of low-density polyethylene (LDPE), high-density polyethylene (HDPE), and ultrahigh molecular weight polyethylene (UHMWPE). Also, the binder may have a particle size corresponding to that of the powdered activated carbon.

An injection hole 131 of the material injection unit 130 may be inserted to the inner space of the mold 111 and movable in a vertical direction as illustrated in FIG. 3.

The material pressing unit 140 includes an upper plate 141, an upper punch 142, and a lower punch 143 as illustrated in FIG. 4.

The upper plate 141 may be disposed at an upper end of the mold 111 to block the inner space of the mold 111.

Also, the upper punch 142 serves to press the upper plate 141 downward toward the inner space of the mold 111, and the lower punch 143 serves to press the lower plate 112 of the filter molding unit 110 in the upward direction toward the inner space of the mold 111.

The filter separation unit 150 serves to separate a filter that is completed in the inner space of the mold 111 from the mold 111 and accommodate the filter.

Since the filter separation unit 150 has a well-known feature in the field, and the embodiment is not limited to the specific feature as long as the filter separation unit 150 may serve the above-described function, a detailed description thereof will be omitted.

The material injection unit 130, the material pressing unit 140, and the filter separation unit 150 may be installed adjacent to the transferring unit 120 to inject a material to the mold 11 transferring on the transferring unit 120, press the material, and separate and accommodate the completed filter, respectively.

Also, as illustrated in FIG. 1, the filter separation unit 150, the material injection unit 130, and the material pressing unit 140 may be disposed adjacent to each other in an order with respect to a direction in which the filter molding unit 110 is transferred.

Here, a distance (or a time) for transferring the filter molding unit 110 from the material pressing unit 140 to the filter separation unit 150 may be determined in correspondence to a time for thermally treating a material in the inner space of the mold 111, which will be described later.

Hereinafter, a method for manufacturing a carbon block filter will be described based on the above-described constitution of the carbon block filter manufacturing equipment 100.

FIG. 5 is a flowchart representing the method for manufacturing the carbon block filter according to an embodiment.

Referring to FIG. 5, the method for manufacturing the carbon block filter includes a process S11 of heating a mold, a process S12 of injecting a material, a process S13 of pressing a material, and a process S14 of separating a filter. In this case, a process of thermally treating a material is performed between the process S13 of pressing the material, and the process S14 of separating the filter and during the filter molding unit 110 is transferred from the material pressing unit 140 to the filter separation unit 150.

First, in the process S11 of heating the mold, the entire mold 111 is heated at a predetermined temperature by using the heater 113.

Particularly, the mold 111 is heated at a temperature corresponding to a melting point of the binder or a temperature at which the binder cross-links the activated carbon particles to each other. For example, the mold 111 may be heated at a temperature of about 100° C. to about 140° C. when the binder is made of LDPE, heated at a temperature of about 120° C. to about 180° C. when the binder is made of HDPE, and heated at a temperature of about 130° C. to about 250° C. when the binder is made of UHMWPE. Alternatively, the mold 111 may be heated at other temperatures according to a kind or a molecular weight of an individual binder as long as the binder may cross-link particles as described above.

As described above, while the following processes S12, S13, and S14 are performed after the mold 111 is heated, the temperature of the inner space of the mold 111 is maintained within a predetermined range by the temperature adjusting device as described above.

Thereafter, in the process S12 of injecting the material, the material is injected to the inner space of the mold 111 by using the material injection unit 130.

Here, since the mold 111 is in a heated state, when the material is simply dropped in a state in which the injection hole 131 of the material injection unit 130 is disposed at the upper end of the mold 111, the material, which is relatively light, may be scattered by a thermal convection phenomenon in the inner space of the mold 111, and the material may not be properly filled into the mold 111.

Thus, the material may be injected to the lower portion of the mold 111. More specifically, as illustrated in FIG. 3A, the injection hole 131 may be inserted to the inner space through the upper end of the mold 111 so that the injection hole 131 is disposed at the lower portion of the mold 111, and then the injection hole 131 may be gradually withdrawn in the upward direction as the material is injected as in FIGS. 3B and 3C.

Thereafter, in the process S13 of pressing the material, the material in the inner space of the mold 111 is pressed and molded into a shape of the filter such that the upper plate 141 of the material pressing unit 140 blocks the upper end of the mold 111 of the filter molding unit 110 as illustrated in FIG. 4B, and the upper plate 141 is pressed downward by using the upper punch 142 while the lower plate of the filter molding unit 110 is pressured upward by using the lower punch 143 as illustrated in FIG. 4C.

Since the material is pressed in both directions by the upper plate 141 and the lower plate 112, the filter may have a density that is uniformly distributed over an entire volume instead of being biased to one side.

Also, a degree of pressing may be controlled based on whether each of the upper plate 141 and the lower plate 112 moves as many as a predetermined distance. Through this method, the filter may be a constant final height when compared with a case of controlling based on whether a specific stress is applied to each of the upper plate 141 and the lower plate 112.

Thereafter, the filter molding unit 110 is transferred from the material injection unit 130 for the process S14 of separating the filter, and during this process, the material is naturally thermally treated by heat of the mold 111 heated as described above.

Particularly, since the material is injected and thermally treated in a state in which the entire mold 111 is already heated, the material may be thermally heated uniformly from an outside to an inside thereof, and a time required for reaching at an overall thermal equilibrium and thermally heating the material may be remarkably reduced, in comparison with a case of injecting a material to a non-heated mold and then heating the mold.

This may be understood from a comparative experiment below.

TABLE 1

|  | Embodiment | Comparative example |
|---|---|---|
| Time required for heat treatment | About 2 minutes | About 30 minutes |

In the above table 1, the "embodiment" is obtained by measuring a time required for properly thermally treating the material after the material made of powdered activated carbon and LDPE is injected to the mold which already heated at about 150° C. and pressed for about 10 seconds with a pressure of about 5 kg/cm2 by using the upper punch 142 and the lower punch 143. Also, the "comparative example" is obtained by measuring a time required for thermally treating a material in the same level as the embodiment from a time of initially heating a mold after the material made of the same constituents (powdered activated carbon and LDPE) is injected to a non-heated mold having the same material and size is pressed for about 10 seconds with a pressure of about 5 kg/cm2.

Referring to results of the comparative experiment, it may be known that about 30 minutes, i.e., about 15 times more time, are required when the material is injected to the non-heated mold and then heated while about 2 minutes are required to complete the heat treatment according to the method for manufacturing the carbon block filter according to an embodiment.

In this case, for reference, the material injection unit 130 and the filter separation unit 150 may be spaced a distance requiring about 2 minutes for the filter molding unit 110 to be transferred from the material injection unit 130 to the filter separation unit 150 from each other.

The below table 2 relates to an experiment about the filter manufactured by a method according to the embodiment in the above table 1 and is obtained by measuring a residual chlorine removal rate when water having a free residual chlorine concentration of about 2 ppm passes the filter with a flow rate of about 2 l/min.

TABLE 2

|  | 100 ℓ | 1,000 ℓ | 1,500 ℓ | 2,000 ℓ | 2,500 L | 3,000 ℓ | 3,500 ℓ | 4,000 ℓ | 4,500 ℓ |
|---|---|---|---|---|---|---|---|---|---|
| Removal rate | 100% | 100% | 99% | 98% | 98% | 97% | 97% | 94% | 94% |

Referring to the experimental results, it may be known that the method for manufacturing the carbon block filter according to an embodiment extremely saves the manufacturing time and effectively guarantees the filter having a performance of a specific level or more.

Referring to FIG. 5 again, in the following process S14 of separating the filter, the completed filter is separated from the mold 111 by using the filter separation unit 150.

Furthermore, as mentioned above, since the material injection unit 130 is disposed adjacent to the filter separation unit 150, and the temperature of the inner space of the mold 111 is maintained within a predetermined range, the process S12 of injecting the material to the heated mold 111 may be immediately performed again instead of performing the process S11 of heating the mold again after the process S14 of separating the filter.

In other words, immediately after the process S14 of separating the filter, a series of carbon block filter manufacturing processes including "the process S12 of injecting the material→the process S13 of pressing the material→the process of thermally heating the material naturally by the heated mold 111 while the filter molding unit 110 is transferred from the material injection unit 130 to the filter separation unit 150→the process S14 of separating the filter" may be continuously and repeatedly performed.

Thus, the above-described processes are advantageous in automation. Also, when the plurality of filter molding units 110 are arranged on the transferring unit 120 as illustrated in FIG. 1, mass production of the filter is advantageous through a method in which the material injection unit 130 sequentially injects the material to each mold 111, the material pressing unit 140 sequentially presses the material, and the material injection unit 130 consecutively injects the material to the mold 111 that is circulated and returned again immediately after the filter separation unit 150 separate the completed filter from each mold 111 as the material is thermally treated naturally while transferred from the plurality of filter molding units 110 to the filter separation unit 150.

FIG. 6 is a schematic view of equipment 200 for manufacturing a carbon block filter (hereinafter, referred to as "carbon block filter manufacturing equipment 200") according to another embodiment, and FIG. 7 is a flowchart representing a method for manufacturing a carbon block filter according to another embodiment.

When compared with the carbon block filter manufacturing equipment 100 according to an embodiment, the carbon block filter manufacturing equipment 200 according to another embodiment is different in that a material pressing unit 240, a filter separation unit 250, and a material injection unit 230 are sequentially disposed with respect to a direction in which a filter molding unit 210 is transferred.

In this case, as illustrated in FIG. 7, a process of thermally treating a material while the filter molding unit 210 is transferred from the material injection unit 230 to the material pressing unit 240 is performed between a process S22 of injecting the material and a process S23 of pressing the material.

In other words, while the filter is completed by pressing and then thermally treating the material in the method for manufacturing the carbon block filter according to an embodiment, the filter is completed by thermally treating and then pressing the material in the method for manufacturing the carbon block filter according to another embodiment.

Here, a distance (or a time) for transferring the filter molding unit 210 from the material injection unit 230 to the material pressing unit 240 may be determined in correspondence to a time for thermally treating the material in the inner space of the mold 210.

Other features are substantially the same as the carbon block filter manufacturing equipment 100 and the method for manufacturing the carbon block filter according to an embodiment, and although there are different points, the different points may be obvious to a person skilled in the art. Thus, a redundant description thereof will be omitted.

The carbon block filter manufacturing equipment and the method for manufacturing the carbon block filter according to an embodiment, which are described above and illustrated in the drawings, are merely one embodiment. The technical idea of an embodiment is not limited to the above embodiment.

For example, the carbon block filter manufacturing equipment 100 according to an embodiment is illustrated such that the lower plate 112 and the core 115 are separately provided, and the lower plate 112 is movable relatively to the core 115 in FIG. 4. However, depending on cases, the lower plate 112 and the core 115 may be integrated with each other to move together.

Also, the carbon block filter manufacturing equipment 100 according to an embodiment is illustrated such that as the lower plate 112 and the lower punch 143 are separated from each other, the lower punch 143 moves upward to contact the lower plate 112 (refer to FIGS. 4A and 4B), and then the lower punch 143 moves further upward to press the material upward (refer to FIGS. 4B and 4C). However, depending on cases, the lower plate 112 and the lower punch 143 may be integrated with each other to move together. Likewise, the upper plate 141 and the upper punch 142 may be provided separately from each other or integrated with each other to move together depending on cases.

The equipment for manufacturing the carbon block filter and the method for manufacturing the carbon block filter according to the embodiment may save the time required for thermally treating the material by heating the mold in advance using the heater and injecting the material for filter manufacturing to the heated mold.

Also, after the mold is heated once, the temperature is maintained with a predetermined range while the following processes are performed. Thus, the process of injecting the material may be consecutively performed again with the heated mold immediately after the completed filter is separated to further save the manufacturing time and costs.

The description of the present disclosure is intended to be illustrative, and those with ordinary skill in the technical field of the present disclosure pertains will be understood that the present disclosure can be carried out in other specific forms without changing the technical idea or essential features.

What is claimed is:

1. An apparatus for manufacturing a carbon block filter, the apparatus comprising:
 a mold having an inner space;
 a heater coupled to the mold to heat the mold;
 a material injection unit configured to inject a material to the mold heated by the heater; and
 a material pressing unit configured to press the material,
 wherein the material includes a powdered activated carbon and a binder, and
 wherein the heater heats the mold at a temperature at which the binder cross-links the activated carbon particles to each other prior to the material being injected to the mold,
 wherein the apparatus further comprises a transferring unit extending along a circumference of a closed figure to transfer the mold in one direction,
 wherein each of the material injection unit and the material pressing unit is installed to perform a function thereof on the mold transferred on the transferring unit,
 wherein the material injection unit and the material pressing unit are disposed adjacent to each other in an order with respect to a direction in which the mold is transferred, and
 wherein a first distance of transferring the mold from the material pressing unit to a location where a thermally treated filter is separated from the mold is spaced in correspondence to a time required for thermally treating the material, the first distance is longer than a second distance, wherein the second distance corresponds to a distance of transferring the mold from the material injection unit to the material pressing unit; or
 wherein a first distance of transferring mold from the material injection unit to the material pressing unit is spaced in correspondence to a time required for thermally treating the material, the first distance is longer than a second distance, wherein the second distance corresponds to a distance of transferring the mold from the material pressing unit to a location where a thermally treated filter is separated from the mold.

2. The apparatus of claim 1 further comprising a temperature sensor configured to measure a temperature of the mold,
 wherein the heater is controlled to stop operating when a temperature measured by the temperature sensor is higher than a predetermined range and operate again when the temperature measured by the temperature sensor is lower than the predetermined range.

3. The apparatus of claim 2, wherein the heater is divided in plurality, and the plurality of heaters are independently controlled.

4. The apparatus of claim 1, wherein an injection hole of the material injection unit is inserted to the inner space through an upper end of the mold and disposed at a lower portion of the mold, and then gradually withdrawn upward as the material is injected.

5. The apparatus of claim 1, wherein the mold has a pipe shape extending in a vertical direction, and the apparatus further comprises:
an upper plate disposed at an upper end of the mold to block the inner space and being movable downward;
a lower plate disposed at a lower end of the mold to block the inner space and being movable upward;
an upper punch configured to press the upper plate downward; and
a lower punch configured to press the lower plate upward simultaneously when the upper punch presses the upper plates downward.

6. The apparatus of claim 1, wherein the binder is made of low-density polyethylene (LDPE), high-density polyethylene (HDPE), or ultrahigh molecular weight polyethylene (UHMWPE), and
the heater heats the mold at a temperature of about 100° C. to about 140° C. when the binder is made of LDPE, at a temperature of about 120° C. to about 180° C. when the binder is made of HDPE, and at a temperature of about 130° C. to about 250° C. when the binder is made of UHMWPE.

7. The apparatus of claim 6, wherein the activated carbon has a particle size of about 50 meshes to about 325 meshes.

8. The apparatus of claim 6, wherein the binder has a particle size corresponding to that of the activated carbon.

* * * * *